(12) United States Patent
Yoon et al.

(10) Patent No.: US 9,613,630 B2
(45) Date of Patent: Apr. 4, 2017

(54) APPARATUS FOR PROCESSING A SIGNAL AND METHOD THEREOF FOR DETERMINING AN LPC CODING DEGREE BASED ON REDUCTION OF A VALUE OF LPC RESIDUAL

(75) Inventors: Sung Yong Yoon, Seoul (KR); Tack Sung Choi, Seoul (KR); Hyun Kook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1237 days.

(21) Appl. No.: 13/508,410

(22) PCT Filed: Nov. 12, 2010

(86) PCT No.: PCT/KR2010/007986
§ 371 (c)(1),
(2), (4) Date: May 7, 2012

(87) PCT Pub. No.: WO2011/059254
PCT Pub. Date: May 19, 2011

(65) Prior Publication Data
US 2012/0226496 A1    Sep. 6, 2012

Related U.S. Application Data

(60) Provisional application No. 61/316,383, filed on Mar. 23, 2010, provisional application No. 61/260,822, filed on Nov. 12, 2009.

(51) Int. Cl.
*G01L 19/00* (2006.01)
*G01L 15/00* (2006.01)
(Continued)

(52) U.S. Cl.
CPC ............. *G10L 19/06* (2013.01); *G10L 19/20* (2013.01); *G10L 15/063* (2013.01);
(Continued)

(58) Field of Classification Search
CPC ....................................................... G10L 19/12
(Continued)

(56) References Cited

U.S. PATENT DOCUMENTS

| 4,672,638 A * | 6/1987 | Taguchi | G01S 7/292 327/167 |
| 6,202,045 B1 * | 3/2001 | Ojala | G10L 19/002 704/203 |

(Continued)

FOREIGN PATENT DOCUMENTS

WO   WO 2008/151755   * 12/2008

OTHER PUBLICATIONS

International Search Report dated Jul. 14, 2011 for Application No. PCT/KR2010/007986, 2 pages.

(Continued)

*Primary Examiner* — Farzad Kazeminezhad
(74) *Attorney, Agent, or Firm* — Fish & Richardson P.C.

(57) ABSTRACT

An apparatus for processing a signal and method thereof are disclosed. The present invention includes receiving coding mode information indicating a speech coding scheme or an audio coding scheme, linear prediction coding degree information indicating a linear prediction coding degree, and the signal including at least one of a speech signal and an audio signal; decoding the signal according to the speech coding scheme or the audio coding scheme based on the coding mode information; decoding linear prediction coding coefficients of the signal based on the linear prediction coding degree information; and generating an output signal by applying the decoded linear prediction coding coefficients to the decoded signal. In this case, the linear prediction coding degree information is determined based on a variation of a value of an LPC residual generated from performing the linear prediction coding on the signal. It further determines (Continued)

whether or not the said residual decreases by an increase in the linear prediction coding degree, and it determines an appropriate LPC coding degree in each case.

15 Claims, 14 Drawing Sheets

(51) Int. Cl.
*G10L 19/06* (2013.01)
*G10L 19/20* (2013.01)
*G10L 15/06* (2013.01)
*G10L 19/02* (2013.01)
*G10L 19/107* (2013.01)
*G10L 19/22* (2013.01)

(52) U.S. Cl.
CPC ........ *G10L 19/0212* (2013.01); *G10L 19/107* (2013.01); *G10L 19/22* (2013.01)

(58) Field of Classification Search
USPC .......................................................... 704/201
See application file for complete search history.

(56) References Cited

U.S. PATENT DOCUMENTS

2003/0004711 A1   1/2003   Koishida et al.
2009/0192792 A1   7/2009   Lee et al.
2011/0173011 A1*  7/2011   Geiger et al. ................. 704/500

OTHER PUBLICATIONS

Bessette, B. et al. "Universal Speech/Audio Coding Using Hybrid ACELP/TCX Techniques", In Acoustics, Speech, and Signal Processing, 2005, Proceedings, (ICASSP '05), IEEE International Conference on, Mar. 18-23, 2005, pp. iii-301-iii-304, vol. 3, 4 pages.

Lecomte, J. et al. "Efficient Cross-Fade Windows for Transitions Between LPC-based and non-LPC based Audio Coding", In Audio Engineering Society Convention Paper 7712, presented at the AES 126th Convention, Munich, Germany, May 7-10, 2009, pp. 1-9, 9 pages.

* cited by examiner (a)

(b)

(c)

(A)

(B)

APPARATUS FOR PROCESSING A SIGNAL AND METHOD THEREOF FOR DETERMINING AN LPC CODING DEGREE BASED ON REDUCTION OF A VALUE OF LPC RESIDUAL

CROSS REFERENCE TO RELATED APPLICATIONS

This application is a U.S. National Phase Application under 35 U.S.C. §371 of International Application PCT/KR2010/007986, filed on Nov. 12, 2010, which claims the benefit of U.S. Provisional Application Ser. No. 61/260,822, filed on Nov. 12, 2009, and U.S. Provisional Application Ser. No. 61/316,383, filed on Mar. 23, 2010, the entire contents of which are hereby incorporated by reference in their entireties.

TECHNICAL FIELD

The present invention relates to an apparatus for processing a signal and method thereof. Although the present invention is suitable for a wide scope of applications, it is particularly suitable for simplifying a structure of a coding device by performing LPC (linear prediction coding) using a variable degree.

BACKGROUND ART

Generally, an audio property based coding scheme is used for such an audio signal as a music signal. A speech property based coding scheme is used for a speech signal. If an audio signal is included in a speech signal more or less, it is able to use a coding scheme of a frequency domain processing based on the speech property.

DISCLOSURE OF THE INVENTION

Technical Problem

However, a speech and audio signal processor according to a related art uses three kinds of modules for performing three kinds of the above mentioned coding schemes. As the number of the usable modules is incremented, if an inter-module switching is generated, the number of transition parts to be processed is incremented as well.

Technical Solution

Accordingly, the present invention is directed to an apparatus for processing a signal and method thereof that substantially obviate one or more of the problems due to limitations and disadvantages of the related art.

An object of the present invention is to provide an apparatus for processing a signal and method thereof, by which distortion of an original signal is prevented using linear prediction coding of a variable degree instead of a fixed degree.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing a signal according to the present invention includes receiving the signal including at least one of a speech signal and an audio signal, coding mode information indicating a speech coding scheme or an audio coding scheme and linear prediction coding degree information indicating a linear prediction coding degree, decoding the signal according to the speech coding scheme or the audio coding scheme based on the coding mode information, decoding linear prediction coding coefficients of the signal based on the linear prediction coding degree information, and generating an output signal by applying the decoded linear prediction coding coefficients to the decoded signal. And, the linear prediction coding degree information is determined based on a variation of a value of an LPC residual generated from performing the linear prediction coding on the signal.

Preferably, if the signal is the speech signal having a lot of voiced sound, the linear prediction coding degree information indicates a degree higher than that of the speech signal having a lot of unvoiced sound.

Preferably, if the signal is the audio signal having a strong tonal component, the linear prediction coding degree information indicates a degree higher than that of the audio signal having a week tonal component.

Preferably, if the signal is an audio-like signal, the linear prediction coding degree information indicates a degree lower than that of a speech-like signal.

Preferably, a frame length of the audio signal is an integer multiple of a frame length of the speech signal.

Preferably, the method further includes, if the decoded signal is the speech or audio signal and a signal of a previous frame is different from the decoded signal, preventing aliasing by compensating the decoded signal using the signal of the previous frame.

To further achieve these and other advantages and in accordance with the purpose of the present invention, an apparatus for processing a signal includes a multiplexer receiving an LPC bitstream including linear prediction coding degree information indicating a linear prediction coding degree and linear prediction coding coefficients, the signal including at least one of a speech signal and an audio signal, and coding mode information indicating a speech coding scheme or an audio coding scheme, an ACELP decoding unit decoding the signal according to the speech coding scheme if the coding mode information indicates the speech coding scheme, a TCX decoding unit decoding the signal according to the audio coding scheme if the coding mode information indicates the audio coding scheme, and an LPC decoding unit decoding the linear prediction coding coefficients of the signal based on the linear prediction coding degree information, the LPC decoding unit generating an output signal by applying the decoded linear prediction coding coefficients to the decoded signal. Moreover, the linear prediction coding degree information is determined based on a variation of a value of an LPC residual generated from performing the linear prediction coding on the signal.

To further achieve these and other advantages and in accordance with the purpose of the present invention, a method of processing a signal includes determining linear prediction coding degree information indicating a variable degree of linear prediction coding coefficients according to property of an input signal, determining the linear prediction coding coefficients based on the linear prediction coding degree information, generating an LPC residual using the linear prediction coding coefficients and the input signal, and coding the LPC residual using either an audio coding scheme or a speech coding scheme. Moreover, the linear prediction coding degree information is determined based on a variation of a value of an LPC residual generated from performing the linear prediction coding on the input signal.

To further achieve these and other advantages and in accordance with the purpose of the present invention, an apparatus for processing a signal includes an LPC analysis unit determining linear prediction coding degree information indicating a variable degree of linear prediction coding coefficients according to property of an input signal, the LPC analysis unit determining the linear prediction coding coefficients based on the linear prediction coding degree information, the LPC analysis unit generating an LPC residual using the linear prediction coding coefficients and the input signal, an ACELP encoding unit coding the LPC residual using an audio coding scheme, a TCX encoding unit coding the LPC residual using a speech coding scheme, and a multiplexer generating a bitstream including the linear prediction coding degree information, the linear prediction coding coefficients and the coded signal. Moreover, the linear prediction coding degree information is determined based on a variation of a value of an LPC residual generated from performing the linear prediction coding on the input signal.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, the present invention variably determines an application degree of linear prediction coding using linear prediction degree information variably determined according to a property of a signal, thereby efficiently coding a signal resulting from mixing speech and audio signals together using modules of which number is smaller than that of modules configuring a general signal processor.

Secondly, the present invention performs linear prediction coding by variably determining linear prediction degree information according to a property of a signal, thereby preventing signal distortion frequently generated in case of performing linear prediction coding of a fixed degree. And, the present invention is able to efficiently code a speech or audio signal of which LPC modeling is difficult.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Figure 1:
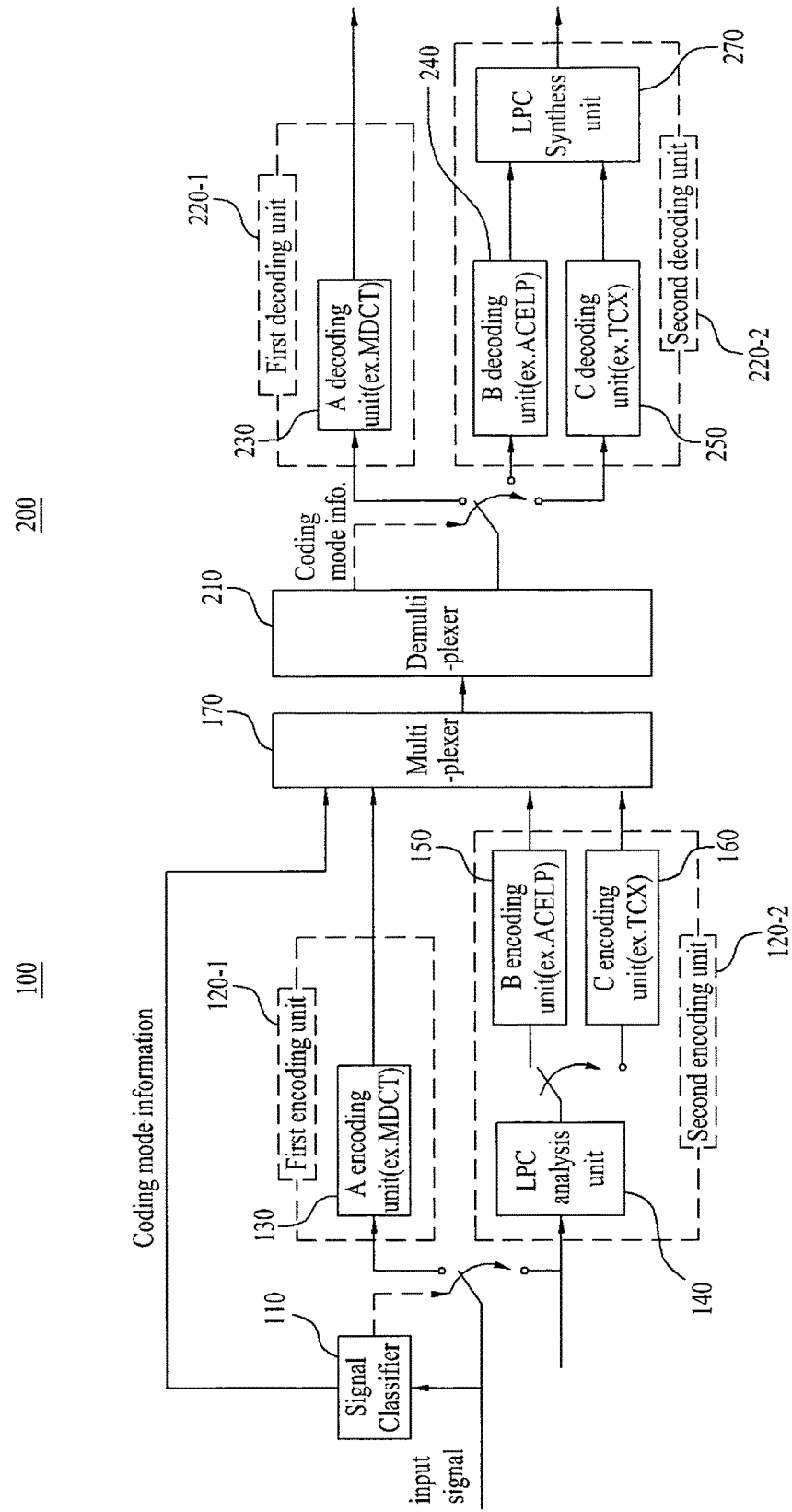
FIG. 1 is a schematic block diagram of an apparatus for processing a signal including speech and audio signals according to a first embodiment of the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing an audio includes receiving coding mode information indicating a speech coding scheme or an audio coding scheme, linear prediction coding degree information indicating a linear prediction coding degree, and the signal including at least one of a speech signal and an audio signal; decoding the signal according to the speech coding scheme or the audio coding scheme based on the coding mode information; decoding linear prediction coding coefficients of the signal based on the linear prediction coding degree information; and generating an output signal by applying the decoded linear prediction coding coefficients to the decoded signal, wherein the linear prediction coding degree information is determined based on a variation of a value of an LPC residual generated from performing the linear prediction coding on the signal.

To further achieve these and other advantages and in accordance with the purpose of the present invention, an apparatus for processing a signal includes a multiplexer receiving an LPC bitstream including linear prediction coding degree information indicating a linear prediction coding degree and linear prediction coding coefficients, the signal including at least one of a speech signal and an audio signal, and coding mode information indicating a speech coding scheme or an audio coding scheme; an ACELP decoding unit decoding the signal according to the speech coding scheme if the coding mode information indicates the speech coding scheme; a TCX decoding unit decoding the signal according to the audio coding scheme if the coding mode information indicates the audio coding scheme; and an LPC synthesis unit decoding the linear prediction coding coefficients of the signal based on the linear prediction coding degree information, and generating an output signal by applying the decoded linear prediction coding coefficients to the decoded signal, wherein the linear prediction coding degree information is determined based on a variation of a value of an LPC residual generated from performing the linear prediction coding on the signal.

It is to be understood that both the foregoing general description and the following detailed description are exemplary and explanatory and are intended to provide further explanation of the invention as claimed.

Mode for Invention

Reference will now be made in detail to the preferred embodiments of the present invention, examples of which are illustrated in the accompanying drawings. First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in best way. The embodiment disclosed in this disclosure and configurations shown in the accompanying drawings are just one preferred embodiment and do not represent all technical idea of the present invention. Therefore, it is understood that the present invention covers the modifications and variations of this invention provided they come within the scope of the appended claims and their equivalents at the timing point of filing this application.

Specifically, 'coding' can be construed as 'encoding' or 'decoding' selectively.

Moreover, 'information' in this disclosure is the terminology that generally includes values, parameters, coefficients, elements and the like and its meaning can be construed as different occasionally, by which the present invention is non-limited.

In this disclosure, in a broad sense, an audio signal is conceptionally discriminated from a video signal and designates all kinds of signals that can be auditorily identified in case of being played back. In a narrow sense, the audio signal means a signal having none or small quantity of speech properties. Audio signal of the present invention should be construed in a broad sense. Yet, the audio signal of the present invention can be understood as an audio signal in a narrow sense in case of being used as discriminated from a speech signal.

FIG. 1 is a schematic block diagram of an apparatus 100 and 200 for processing a signal including speech and audio signals according to a first embodiment of the present invention.

Referring to FIG. 1, a signal processing apparatus according to a first embodiment of the present invention can include an encoder 100 and a decoder 200. And, the encoder 100 can mainly include a signal classifier 110, a first encoding unit 120-1, a second encoding unit 120-2 and a multiplexer 170.

The signal classifier 110 analyzes properties of an input signal, determines what kind of coding scheme is used to encode a current frame (or subframe) based on the analyzed properties, and is then able to generate coding mode information indicating the determined coding scheme. In this case, the generated coding mode information indicates a first coding scheme used by the first encoding unit 120-1 and a second coding scheme used by the second encoding unit 120-2, or is able to indicate one of an A coding scheme used by an A encoding unit 130, a B coding scheme used by a B encoding unit 150 and a C coding scheme used by a C encoding unit 160. The coding schemes shall be described in detail later in this disclosure, by which the present invention is non-limited.

The first encoding unit 120-1 and the second encoding unit 120-2 indicate units, to which the first and second coding schemes based on different domains are applied, respectively. In this case, the domains can include a linear prediction coding (LPC) domain, a frequency domain, a time domain and the like. For instance, if the first coding scheme indicates the coding scheme based on the linear prediction coding domain, the second coding scheme is able to indicate the coding scheme based on the frequency domain. Regarding this, definitions and properties according to domain types shall be described in detail later.

In case that the second coding scheme indicates the linear prediction coding domain based coding scheme, the second encoding unit 120-2 can include a linear prediction coding (LPC) analysis unit 140 and a pair of specific coding units 150 and 160 to which different coding schemes are applied, respectively.

The linear prediction coding analysis unit 140 performs linear prediction coding on an inputted signal to generate linear prediction coding coefficients and an LPC residual remaining after the prediction. In this case, it is preferable that the linear prediction coding coefficient is generally fixed to 16 degrees in general.

Afterwards, the LPC residual is inputted to the B encoding unit 150 or the C encoding unit 160 and is then encoded by the B or C coding scheme. In this case, the B coding scheme can include ACELP (algebraic code excited linear prediction) and the C coding scheme can include TCX (transform coded excitation), by which the present invention is non-limited. Meanwhile, in case that the B encoding unit 150 and the C encoding unit 160 use ACELP and TCX, respectively, the A encoding unit 130 preferably uses MDCT (modified discrete Fourier transform). Generally, ACELP is the coding scheme suitable for a speech signal, while MDCT or TCX is the coding scheme suitable for an audio signal. A general signal processor uses MDCT to process a signal of which major component is an audio signal and uses TCX to process a small quantity of an audio signal included in a signal consisting of the audio signal and a speech signal corresponding to a major component of the signal.

Referring to FIG. 1, the coding mode information can include coding identity information and sub-coding identity information. The coding identity information indicates either the first coding scheme or the second coding scheme applied to a current frame. And, in case that a current frame uses the second coding scheme, the sub-coding identity information may be the information indicating whether the B coding scheme or the C coding scheme is used.

The coding mode information is generated by the signal classifier 110, determines the coding unit 120-1/120-2 or 130/150/160 to which the input signal will be inputted, and is then transmitted to the multiplexer 170.

Meanwhile, as mentioned in the foregoing description, the input signal is partitioned per frame or subframe based on the coding mode information generated by the signal classifier 110 and is then inputted to the first encoding unit 120-1 or the second encoding unit 120-2. Subsequently, data encoded by each coding scheme according to the above described method can be transmitted to the multiplexer 170.

The multiplexer 170 generates at least one or more bitstreams by multiplexing the coding mode information and the data encoded by each of the coding units together and then transmits the generated at least one or more bitstreams.

The decoder 200 of the signal processing apparatus according to the first embodiment of the present invention is able to mainly include a demultiplexer 210, a first decoding unit 220-1 and a second decoding unit 220-2. In this case, the first decoding unit 220-1 and the second decoding unit 220-2 are the components of a decoder side to correspond to the first encoding unit 120-1 and the second encoding unit 120-2 described with reference to the encoder 100, respectively. As mentioned in the foregoing description with reference to the encoder 100, the decoder 200 can include an A decoding unit 230, a B decoding unit 240 and a C decoding unit 250. If the first decoding unit 220-1 corresponds to the A decoding unit 230, the second decoding unit 220-2 can include the B decoding unit 240 and the C decoding unit 250. Moreover, the second decoding unit 220-2 is able to further include an LPC synthesis unit 270 configured to reconstruct an original signal using the linear prediction coding coefficients by receiving an input of a signal decoded by the B decoding unit 240 or the C decoding unit 250.

A first decoding scheme applied by the first decoding unit 220-1 and a second decoding scheme applied by the second decoding unit 220-2 indicate the decoder side schemes corresponding to the coding schemes described with reference to the encoder 100. Moreover, in case that the decoder 200 includes the A decoding unit 230, the B decoding unit 240 and the C decoding unit 250, A to C decoding schemes respectively applied to the A to C decoding units 230 to 250 indicate the decoding schemes corresponding to the coding schemes described with reference to the encoder 100 as well. In particular, the A decoding scheme is MDCT, the B decoding scheme is ACELP, and the C decoding scheme is TCX, for example. And, the decoding schemes can be determined according to the coding mode information extracted by the demultiplexer 210. As mentioned in the foregoing description, the coding mode information can include coding identity information and sub-coding identity information as well.

Thus, the signal processing apparatus according to the first embodiment of the present invention mainly uses two kinds of modules (i.e., the first coding unit 220-1 and the second coding unit 220-2) according to domains processed in accordance with signal properties. In particular, the signal processing apparatus according to the first embodiment of the present invention includes the module (i.e., the B decoding unit 240) configured to process a speech signal if an input signal includes the speech signal. And, the signal processing apparatus according to the first embodiment of the present invention includes the module (i.e., the C decoding unit 250) configured to process an audio signal included in the speech signal. Moreover, the signal processing apparatus according to the first embodiment of the present invention includes the module (i.e., the A decoding unit 230) configured to process an audio signal if an input signal includes the audio signal.

So to speak, the signal processing apparatus according to the first embodiment of the present invention includes three kinds of modules including an MDCT module similar to a conventional AAC to process an audio signal, an ACELP module configured to process a speech signal in LPD, and a TCX module configured to process an audio signal in LPD. Since each module uses a different window type, a different frame length and the like, if a module switching occurs, a method of processing transition is further required.

Therefore, a second embodiment of the present invention proposes a signal process apparatus capable of reducing signal distortion in coding by decrementing the number of modules used for signal processing.

Figure 2:
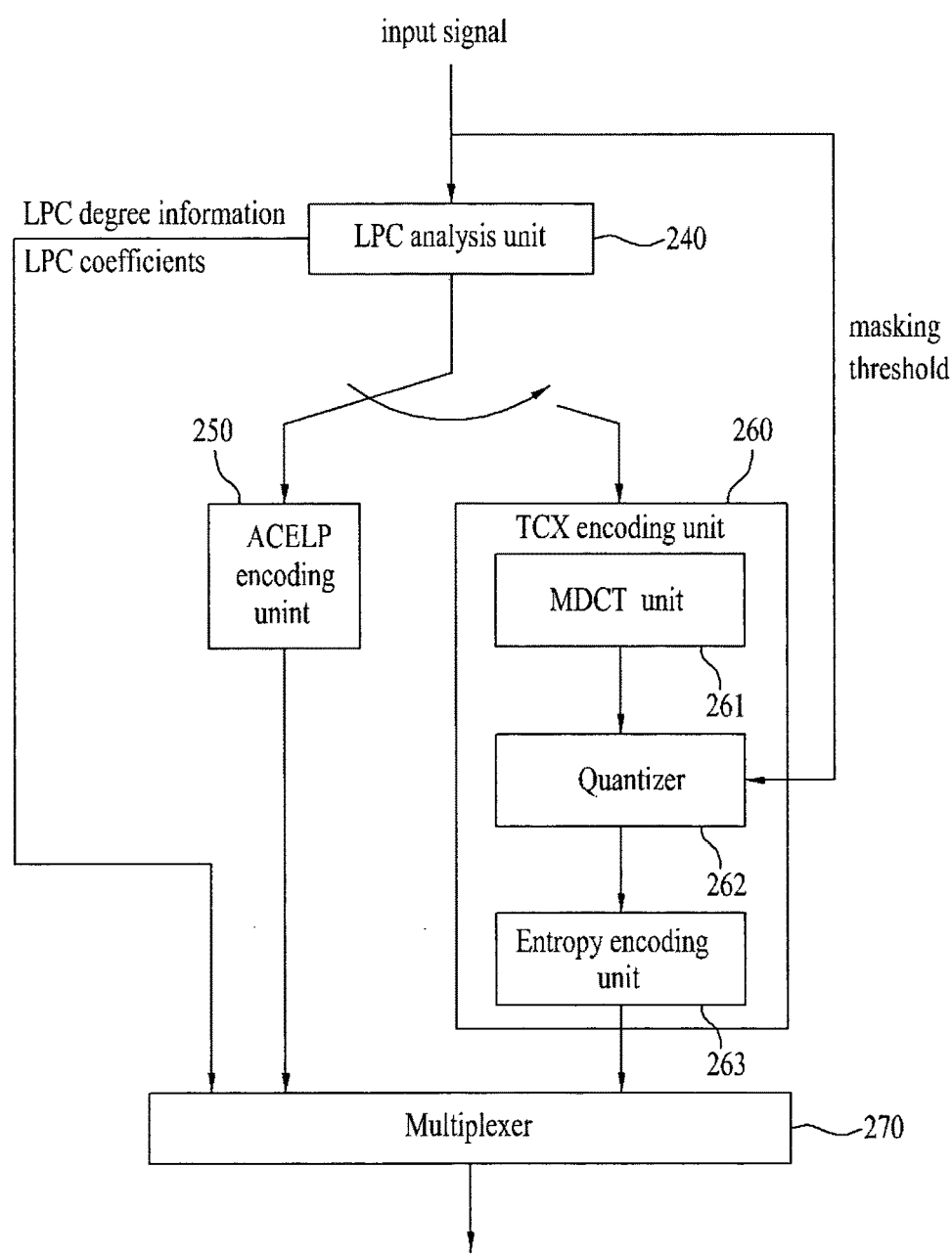
FIG. 2 is a schematic block diagram of a signal encoding apparatus according to a second embodiment of the present invention.

FIG. 2 is a schematic block diagram of a signal encoding apparatus 100A according to a second embodiment of the present invention.

Referring to FIG. 2, a signal encoding apparatus 100A mainly includes an LPC analysis unit 240, an ACELP encoding unit 250, a TCX encoding unit 260 and a multiplexer 270. And, the signal encoding apparatus 100A is able to further include a signal classifier (not shown in the drawing). In this case, the signal classifier determines a coding scheme based on property of an input signal, generates coding mode information indicating the coding scheme, and then transmits the generated coding mode information to the multiplexer 270.

The LPC analysis unit 240 receives an input signal and then performs linear prediction coding on the received input signal. In doing so, the LPC analysis unit 240 according to the second embodiment of the present invention is able to generate a coefficient of a variable degree according to property of the input signal, whereas the former LPC analysis unit 140 of the encoder 100 described with reference to FIG. 1 performs the linear prediction coding to generate a linear prediction coding coefficient of a fixed degree, e.g., 16 degree. The LPC analysis unit 240 calculates an LPC residual by performing the linear prediction coding of various degrees on the input signal and is then able to determine the variable degree based on the variation of the LPC residual signal.

In other words, as the linear prediction coding degree increases to reduce the LPC residual, it means that the corresponding input signal is fit for the linear prediction of high degree. Hence, the high degree can be determined as the variable degree for the linear prediction coding. On the contrary, if the LPC residual is not reduced despite performing the linear prediction coding by raising the linear prediction coding degree, it is determined that the linear prediction coding of the high degree is not preferable for the input signal, it is able to determine a low degree as the variable degree for the linear prediction coding. Based on whether modeling the input signal is performed well using the linear prediction coding (i.e., whether the LPC residual is reduced), linear prediction codings of various degrees are performed and determined. Hence, it is able to determine the variable degree correspondingly.

In general, in case of a speech signal, since LPC modeling of a signal having a lot of voiced sound is performed better than LPC modeling of a signal having a lot of unvoiced sound, it is able to use the linear prediction coding degree of higher degree. In case of an audio signal, a tonal-strong signal is able to use a linear prediction coding degree higher than a degree of a noise-like signal.

For another instance, if an input signal is a signal in which property of a speech signal is dominant (hereinafter, such a signal is named a speech-like signal), a linear prediction coding coefficient of higher degree is generated. If an input signal is a signal in which property of an audio signal is dominant (hereinafter, such a signal is named an audio-like signal), a linear prediction coding coefficient of low degree can be generated.

Besides, the LPC analysis unit 240 configured to perform the linear prediction coding for generating a coefficient of variable degree shall be described in detail with reference to FIG. 3 later in this disclosure.

The LPC analysis unit 240 is able to generate linear prediction coding (LPC) degree information, linear prediction coding (LPC) coefficients and LPC residual by performing the linear prediction coding on the input signal. In doing so, as mentioned in the foregoing description, the LPC degree information may be variable according to property of the input signal.

The linear prediction coding degree information and the linear prediction coding coefficients generated by the LPC analysis unit 240 are transmitted to the multiplexer 270. And, the LPC residual is inputted to the ACELP encoding unit 250 or the TCX encoding unit 260 based on the coding mode information (not shown in he drawing) determined by the signal classifier (not shown in the drawing). In this case, unlike the former coding mode information described with reference to FIG. 1, the coding mode information can indicate either the ACELP coding scheme or the TCX coding scheme as shown in Table 1.

TABLE 1

| coding mode information (coding_mode) | meaning |
|---|---|
| 0 | Coding by ACELP coding scheme |
| 1 | Coding by TCX coding scheme |

If the coding mode information indicates that the ACELP coding scheme is used, the ACELP encoding unit 250 is able to encode a signal by the scheme determined by receiving an input of the LPC residual. The ACELP encoding unit 250 has the same function of the B encoding unit 150 described with reference to FIG. 1, of which details are omitted from the following description. Moreover, in this disclosure, the ACELP coding scheme corresponds to the voice coding scheme.

The TCX encoding unit 260 mainly includes an MDCT unit 261, a quantizer 262 and an entropy encoding unit 263. In this disclosure, the TCX coding scheme can be called an audio coding scheme. The MDCT unit 261 receives an input of the LPC residual and then performs MDCT on a signal. The transformed signal is inputted to the quantizer 262 and the quantization is performed. As used in AAC, frequency bands are grouped into scale factor bands (sfb) that use the same scale factor. The scale factor bands are then used. Moreover, the quantizer 262 receives an input of a masking threshold per frequency band calculated from an original input signal prior to being inputted to the LPC analysis unit 240 and is then able to perform the quantization per the scale factor band with reference to the masking threshold. In doing so, the quantizer 262 generates the sale factor and the quantized spectral data by Formula 1.

$$X_{ori} \cong X_{quant} = 2^{\frac{scalefactor}{4}} \times \text{spectral\_data}^{\frac{x+1}{x}} \quad \text{[Formula 1]}$$

In Formula 1, the 'x' can be a constant number that is an integer between 3 and 7.

The entropy coding unit 263 performs entropy coding on the scale factor and the quantized spectral data. The entropy coding unit 263 encodes the scale factor and the quantized spectral data by Huffman coding or arithmetic coding, and preferably, by the arithmetic coding, by which the present invention is non-limited.

Hence, if the input signal passes through the LPC analysis unit 240 and then moves to a right path, configuration and function of the TCX encoding unit 260 become similar to those of the A encoding unit 130 shown in FIG. 1.

Subsequently, the multiplexer 270 generates at least one or more bitstreams by multiplexing the linear prediction coding degree information and linear prediction coding coefficients generated by the LPC analysis unit 240 with the data encoded by the ACELP encoding unit 250 or the TCX encoding unit 260 and is then able to transmit the generated at least one or more bitstreams.

In the following description, a method for the LPC analysis unit to generate linear prediction coding coefficients of variable degree in the signal encoding apparatus according to the second embodiment of the present invention is explained in detail with reference to FIG. 3.

Figure 3:
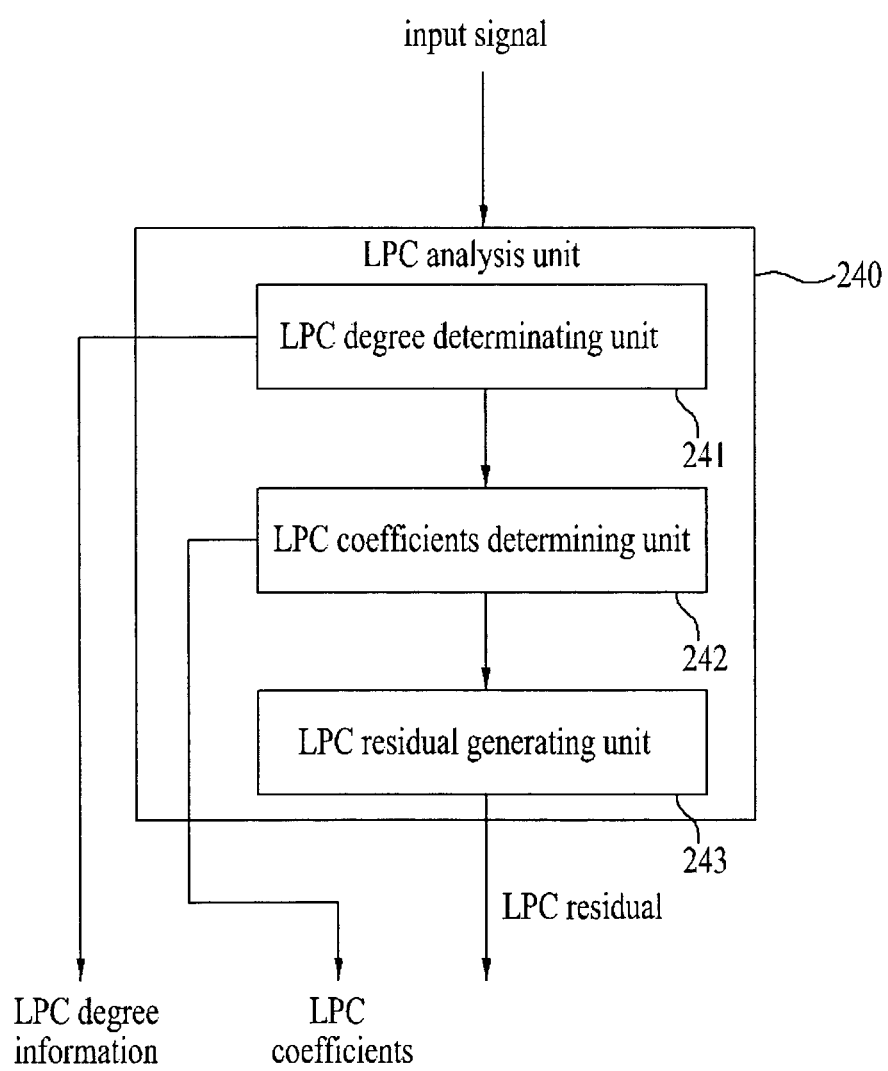
FIG. 3 is a detailed block diagram of an LPC analysis unit of a signal encoding apparatus according to a second embodiment of the present invention.

FIG. 3 is a detailed block diagram of an LPC analysis unit of a signal encoding apparatus according to a second embodiment of the present invention.

Referring to FIG. 3, the LPC analysis unit 240 includes an LPC degree determining unit 241, an LPC coefficients determining unit 242 and an LPC residual generating unit 243.

First of all, in case of receiving an input signal, the LPC degree determining unit 241 obtains property of the input signal and is then able to determine a degree of a linear prediction coding coefficient that will be generated by linear prediction coding. In this case, the property of the input signal can be determined in consideration of an extent of the tonal included in the corresponding signal and a spectral tilt degree. Preferably, the property of the input signal can be determined according to whether the input signal is suitable for the linear prediction coding of high degree. If the input signal is a speech signal having a lot of voiced sound or an audio signal having a tonal-strong property, the LPC degree determining unit 241 generates linear prediction coding degree information indicating a higher degree. On the contrary, if the input signal is a speech signal having a lot of unvoiced sound or a noise-like audio signal, the LPC degree determining unit 241 generates linear prediction coding degree information indicating a lower degree.

Meanwhile, for another instance, if the input signal is a speech-like signal, a linear prediction coding coefficient of high degree is generated. If the input signal is an audio-like signal, a linear prediction coding coefficient of low degree is generated. Hence, the LPC degree determining unit 241 generates linear prediction coding information indicating a higher degree if the input signal is a speech-like signal. On the contrary, the LPC degree determining unit 241 generates linear prediction coding information indicating a lower degree if the input signal is an audio-like signal.

The linear prediction coding degree information is able to indicate a degree of an integer for a linear prediction coding coefficient, and preferably, a degree represented as Formula 2, and more preferably, a degree represented as Formula 3.

Degree (n) indicated by
LPC_degree_information∈{N|0, 2, 4, . . . , 12, 14, 16}     [Formula 2]

Degree (n) indicated by
LPC_degree_information∈{N|0, 4, 8, ..., 12, 16, 32}   [Formula 3]

As mentioned in the above description, if an input signal is less suitable for LPC modeling, linear prediction coding degree information indicating a lower degree is generated. Hence, it is able to select a degree of such a low number as 0, 2 or 0, 4. In case that the input signal include a noise-like audio signal only or a speech signal including an unvoiced sound only, the linear prediction coding degree information can include the information indicating that a degree of the linear prediction coding coefficient is 0.

Meanwhile, in case that the linear prediction coding degree information is determined according to whether an input signal is an audio-like signal or a speech-like signal, when the input signal includes an audio signal only, the linear prediction coding degree information can include the information indicating that a degree of the linear prediction coding coefficient is 0.

In case of indicating a degree represented as Formula 2, the linear prediction coding degree information can be represented using 4 bits. In case of indicating a degree represented as Formula 3, the linear prediction coding degree information can be represented using 3 bits.

As the linear prediction coding degree information indicates the number of previous signals used to predict a signal of a current frame in the linear prediction coding, if the linear prediction coding degree information indicates a bigger integer, it can be observed that the number of the previous signals becomes higher. In particular, as mentioned in the foregoing description, if an input signal is a speech signal having a lot of voiced sound or a tonal-strong audio signal, a high degree is indicated. In this case, it can be recognized that the number of the previous signals used for the linear prediction coding is raised. On the contrary, if an input signal is a speech signal having a lot of unvoiced sound or a noise-like audio signal, the number of the previous signals used for the linear prediction coding will be lowered.

Afterwards, the input signal, of which linear prediction coding degree is determined, is inputted to the LPC coefficients determining unit 242. Subsequently, based on the linear prediction coding degree information determined by the LPC degree determining unit 241, the LPC coefficients determining unit 242 is able to determine linear prediction coding coefficients from the input signal. If the input signal is a speech signal having a lot of unvoiced signal or a more noise-like audio signal, a smaller number of LPC coefficients will be determined based on the linear prediction coding degree information. If the input signal is an audio signal having a lot of voiced sound or a tonal-strong audio signal, a more number of LPC coefficients will be determined based on the linear prediction coding degree information.

Afterwards, the LPC residual generating unit 243 calculates a signal of a difference between the input signal and the linear prediction coding signal calculated by the LPC coefficients determining unit 242 in the course of determining the linear prediction coding coefficients and is then able to output the calculated difference signal as an LPC residual. In this case, if the input signal is a speech signal having a lot of unvoiced sound or a more noise-like audio signal, a smaller number of linear prediction coding coefficients are used. Hence, the LPC coded signal can be different from an original input signal and the LPC residual will be similar to the original input signal. On the contrary, if the input signal is a speech signal having a lot of voiced sound or a tonal-strong audio signal, a greater number of linear prediction coding coefficients are used. Hence, it is highly probable that the LPC residual can becomes a small signal different from the original input signal. In this case, if the LPC residual generated by performing the linear prediction coding is the small signal, it can mean that the input signal is more suitable for the LPC modeling.

The second embodiment of the present invention pays attention to a signal coding method and apparatus in case that the linear prediction coding degree information indicates a lower degree.

In this case, since the LPC residual outputted from the LPC residual generating unit 243 is a signal close to the input signal inputted to the LPC analysis unit 240, if the input signal is an audio signal, the signal encoded through the TCX encoding unit 260 shown in FIG. 2 has the property similar to that of the signal encoded through the MDCT encoding unit 130 shown in FIG. 1.

In particular, since the LPC analysis unit 240 according to the second embodiment of the present invention determines the linear prediction coding degree not as the fixed degree but as the variable degree according to the signal property, it is able to efficiently code a speech or audio signal, of which LPC modeling is difficult, vulnerable to distortion in case of applying the linear prediction coding of the fixed degree.

Moreover, since the TCX encoding unit 240 according to the second embodiment of the present invention have the same configuration and function o the A encoding unit 130 (i.e., the MDCT encoding unit) according to the first embodiment of the present invention, the present invention provides an effect of coding an audio signal and a speech signal effectively using two modules including the ACELP encoding unit 250 and the TCX encoding unit 260 only.

Figure 4:
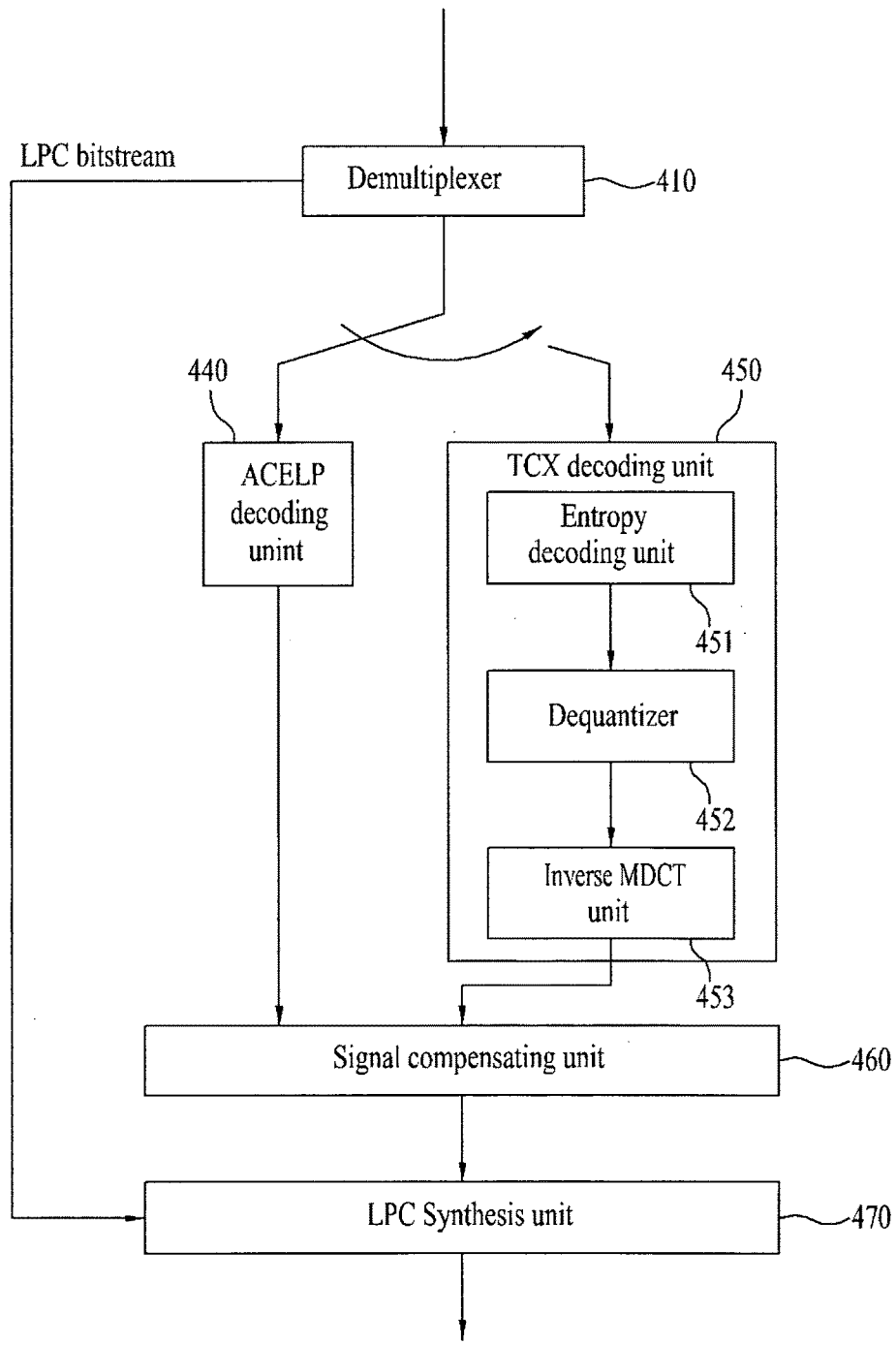
FIG. 4 is a schematic block diagram of a signal decoding apparatus corresponding to the signal encoding apparatus shown in FIG. 2.

FIG. 4 is a schematic block diagram of a signal decoding apparatus 200A corresponding to the signal encoding apparatus 100A shown in FIG. 2 according to the second embodiment of the present invention.

Referring to FIG. 4, a signal decoding apparatus 200A mainly includes a demultiplexer 410, an ACELP decoding unit 440, a TCX decoding unit 450, a signal compensating unit 460 and an LPC synthesis unit 470.

The demultiplexer 410 receives an input of the at least one or more bitstreams transmitted from the multiplexer 270 of the signal encoding apparatus 100A shown in FIG. 2 and then extracts an LPC bitstream including the linear prediction coding degree information and the linear prediction coding coefficients, a first data encoded by ACELP scheme or a second data encoded by TCX scheme, and coding mode information indicating the corresponding coding scheme. In this case, the first or second data can include the data outputted from the ACELP encoding unit 250 described with reference to FIG. 2 or the data outputted from the TCX encoding unit 260 described with reference to FIG. 2.

The first/second data can be decoded by the ACELP/TCX decoding unit 410/450 based on the coding mode information. The ACELP decoding unit 410 performs a general ACELP decoding scheme. And, the TCX decoding unit 450 includes an entropy decoding unit 451, a dequantizer 452 and an inverse MDCT unit 453.

The TCX decoding unit 450 according to the second embodiment of the present invention is the unit corresponding to the TCX encoding unit 260 shown in FIG. 2. The entropy decoding unit 451 decodes the quantized data from the scale factor and spectral data included in the second data. Subsequently, the dequantizer 452 dequantizes the quantized data. The inverse MDCT unit 453 receives the dequantized data and is then able to reconstruct the LPC residual.

Although the TCX decoding unit 450 of the present invention reconstructs the LPC residual, a detailed unit of the TCX decoding unit 450 have the configuration and function similar to those of the A decoding unit 230 of the decoder 200 described with reference to FIG. 1. Therefore, according to an LPC applied extent, the TCX decoding unit 450 is able to perform the same function of the A decoding unit 230 or the C decoding unit 250 shown in FIG. 1.

Therefore, the signal decoding apparatus 200A according to the present invention is able to efficiently code an audio signal, a speech signal and an audio signal mixed with a speech signal using two modules. This shall be described in detail with reference to FIGS. 5 to 7 later in this disclosure.

Meanwhile, the first/second data (hereinafter named a decoded signal) decoded through the ACELP/TCX decoding unit 440/450 is inputted to the signal compensating unit 460.

The signal compensating unit 460 is a unit configured to perform time domain aliasing cancellation (hereinafter abbreviated TDAC) to prevent distortion of a signal generated from a contiguous part of signals respectively decoded by different schemes. This is attributed to the following reasons. First of all, the TCX coding scheme is a scheme of applying a non-rectangular window. Secondly, the ACELP coding scheme is the scheme of applying a rectangular window. Thus, since each coding scheme uses a window of a different type, if signals respectively decoded by different coding schemes are contiguous, such defect as aliasing and the like can be generated due to asymmetry within the rectangular window and the non-rectangular window are overlapped with each other. The signal compensating unit 460 compensates for this defect using folding, unfolding, windowing, compensation information and the like. This shall be described in detail with reference to FIGS. 8 to 10 later in this disclosure.

Afterwards, the LPC synthesis unit 470 is able to reconstruct an original signal by receiving the decoded signal and the LPC bitstream from the signal compensating unit 460 and the demultiplexer 410, respectively. The LPC synthesis unit 470 can vary an extent of applying to the decoded signal according to the linear prediction coding degree information and the linear prediction coding coefficients included in the LPC bitstream. Therefore, the TCX decoding unit 450 is able to efficiently reconstruct an audio signal, of which main component is the audio property difficult for the second decoding unit 220-2 including the general TCX decoding unit 250 to efficiently decode, as well as an audio signal included in a speech signal. The detailed function and role of the LPC synthesis unit 470 are explained with reference to FIG. 5 and FIG. 6 as follows.

Figure 5:
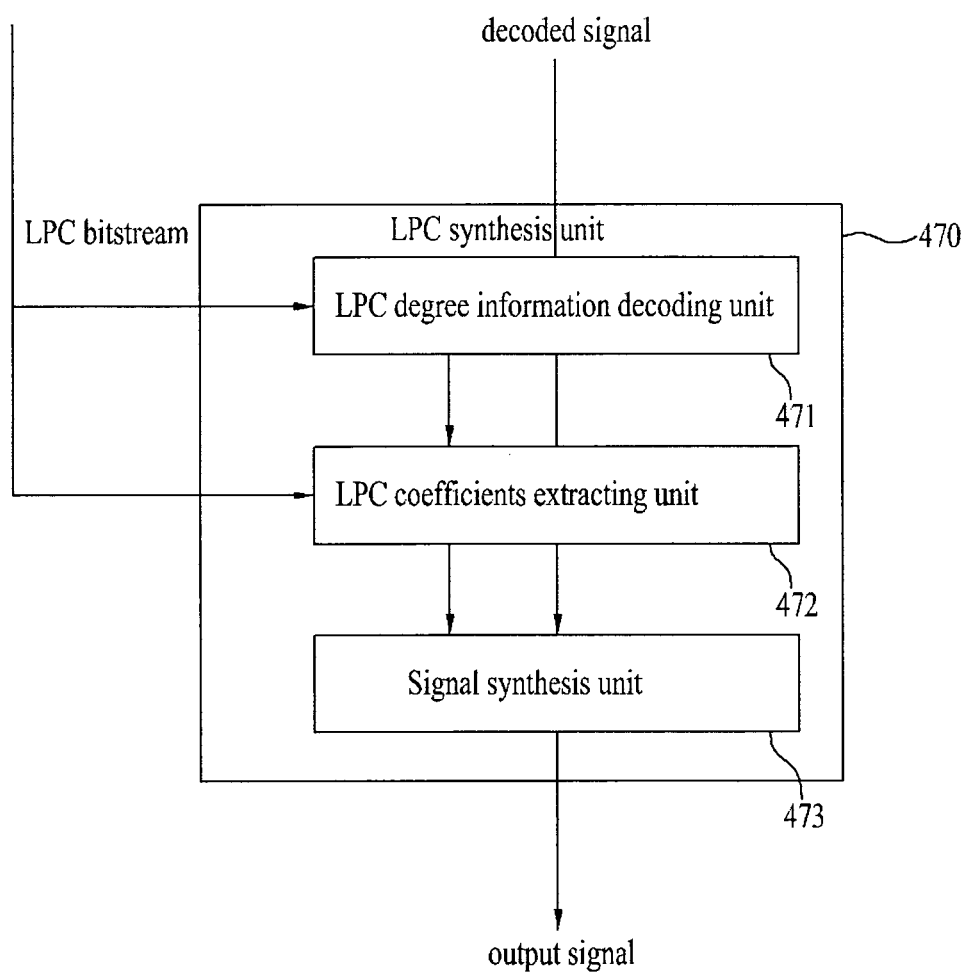
FIG. 5 is a detailed block diagram of an LPC synthesis unit of a signal decoding apparatus according to a second embodiment of the present invention.

FIG. 5 is a detailed block diagram of the LPC synthesis unit 470 shown in FIG. 4.

Referring to FIG. 5, the LPC synthesis unit 470 includes a linear prediction coding degree information decoding unit 471, a linear prediction coding coefficients extracting unit 472 and a signal synthesis unit 473. First of all, the linear prediction coding degree information decoding unit 471 receives an input of an LPC bitstream from the multiplexer 410 and then extracts the linear prediction coding degree information from the LPC bitstream. In this case, the linear prediction coding degree information is identical to the contents described with reference to FIG. 3. If a decoded signal is a speech signal having a lot of unvoiced sound or a more noise-like audio signal, the linear prediction coding degree information will indicate a lower degree.

The linear prediction coding coefficients extracting unit 472 extracts linear prediction coding coefficients from the LPC bitstream based on the linear prediction coding degree.

In this case, since the linear prediction coding degree is proportional to the number of the linear prediction coding coefficients, if the decoded signal is the speech signal having a lot of unvoiced sound or the more noise-like audio signal, it is a matter of course that the less number of the linear prediction coding coefficients are extracted.

The signal synthesis unit 473 generates an output signal by reconstructing an original signal by applying the linear prediction coding coefficients to the decoded signal.

Thus, the signal decoding apparatus 200A according to the second embodiment o the present invention is able to perform the functions of the three modules (i.e., the A decoding unit 230, the B decoding unit 240 and the C decoding unit 250) of the decoder 200 shown in FIG. 1 using the two modules (i.e., the ACELP decoding unit 440 and the TCX decoding unit 450) in a manner that the LPC synthesis unit 470 applies the variable linear prediction coding coefficients using the linear prediction coding degree information variably determined according to the signal property.

Therefore, since the window switchings less than the window switchings among three modules are generated, it is also able to reduce the signal distortions caused by the window switchings. Moreover, in case of coding a signal in which a speech signal and an audio signal are mixed together, the signal can be coded using a less number of modules. Therefore, it is advantageous in simplifying the corresponding signal processing apparatus.

Moreover, when the LCP synthesis unit 270 shown in FIG. 1 applies the linear prediction coding of a fixed degree, it is able to efficiently code a speech or audio signal vulnerable to distortion, i.e., not suitable for the LPC modeling.

Figure 6:
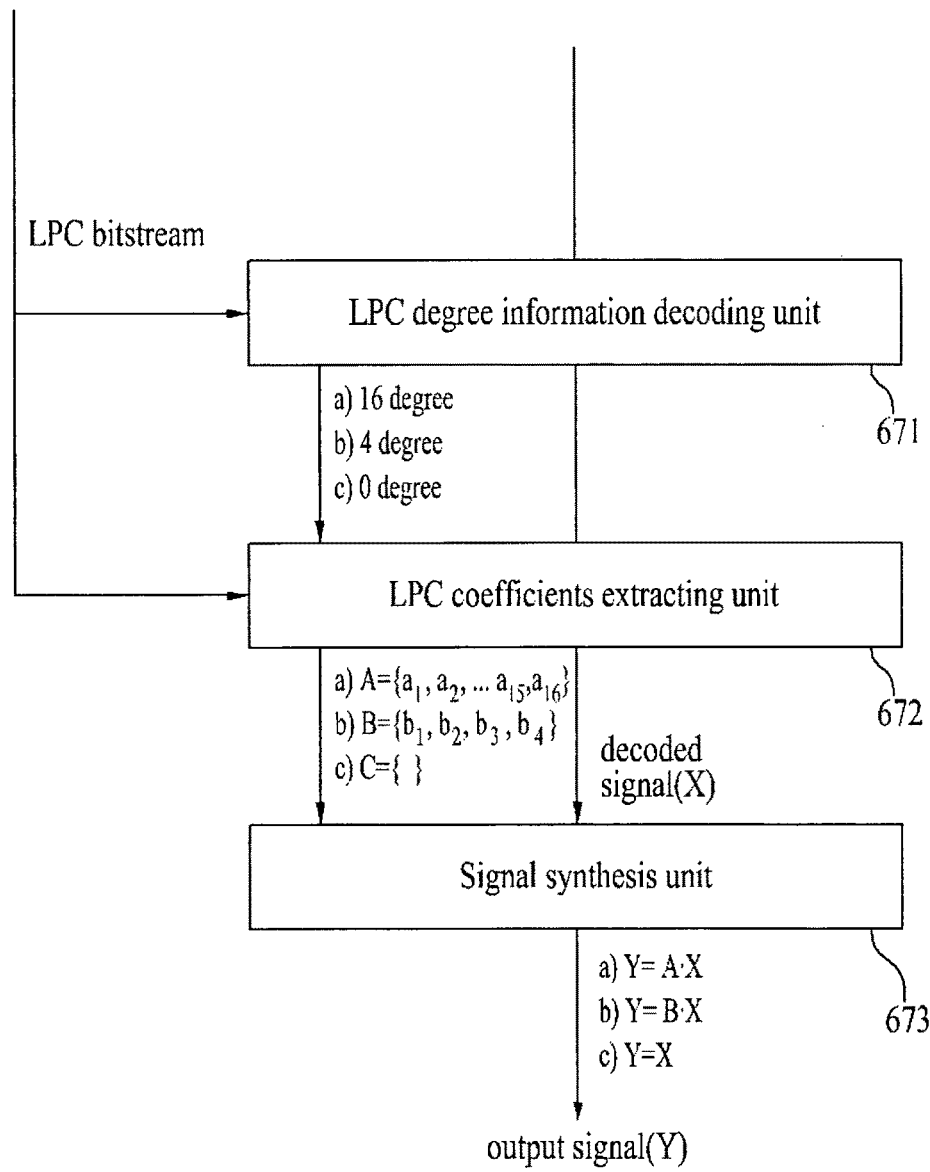
FIG. 6 is a flowchart of a signal decoded in accordance with linear prediction degree information in an LPC synthesis unit according to a second embodiment of the present invention.

FIG. 6 is a flowchart of a signal decoded in accordance with linear prediction degree information in the LPC synthesis unit 470 shown in FIG. 5. As functions of a linear prediction coding degree information decoding unit 671, a linear prediction coding coefficients extracting unit 672 and a signal synthesis unit 673 are equal to those of the former units having the same names in FIG. 5, their details are omitted from the following description. Yet, note the examples shown below the units, respectively.

First of all, in case that the linear prediction coding degree information indicates that a linear prediction coding degree is 16 degree [case of (a)], linear prediction coding coefficients extracted by the linear prediction coding coefficients extracting unit 672 correspond to $A = \{a_1, a_2, a_3, \ldots a_{14}, a_{15}, a_{16}\}$. Subsequently, the signal synthesis unit 673 generates an output signal $(Y=A \cdot X)$ by applying the linear prediction coding coefficients to the decoded signal (X). Since the LPC synthesis unit 270 of the second decoding unit 220-2 according to the first embodiment of the present invention for coding speech and audio signals uses the linear prediction coding coefficients of the 16 degree, when the LPC synthesis unit 470 uses the linear prediction coding coefficients of the 16 degree [case of (a)], the signal decoding apparatus 200A according to the second embodiment of the present invention shown in FIG. 4 is able to perform the same function of the second decoding unit 220-2 of the first embodiment. In particular, in case of (a), an output signal can be generated in the same manner of the method of reconstructing the output signal through the B decoding unit 240 and the LPC synthesis unit 270 according to the first embodiment of the present invention (if the decoding signal (X) is a speech signal) or the method of reconstructing the output signal through the C decoding unit 250 and the LPC synthesis unit 270 according to the first embodiment of the present invention (if the decoded signal (X) is an audio signal mixed in a speech signal).

Secondly, in case that the linear prediction coding degree information indicates that a linear prediction coding degree is 4 degree [case of (b)], linear prediction coding coefficients extracted by the linear prediction coding coefficients extracting unit 672 correspond to B={$b_1, b_2, b_3, b_4$}. Subsequently, the signal synthesis unit 673 generates an output signal (Y=B·X) by applying the linear prediction coding coefficients to the decoded signal (X).

Thirdly, in case that the linear prediction coding degree information indicates that a linear prediction coding degree is 0 degree [case of (c)], linear prediction coding coefficients extracted by the linear prediction coding coefficients extracting unit 672 do not exist at all to result in C={}. Subsequently, the signal synthesis unit 673 finally generates an output signal (Y=X) equal to the decoded signal by applying the linear prediction coding coefficients to the decoded signal (X). In he case of (c), since the linear prediction coding coefficients are not decoded, it can be observed that the decoded signal (X) inputted to the LPC synthesis unit 470 bypasses the LPC synthesis unit 470.

The A decoding unit 230 according to the first embodiment of the present invention does not perform the linear prediction coding but decodes a signal through entropy decoding, dequantization and inverse MDCT. Therefore, when an input signal is decoded into an audio signal in the signal decoding apparatus 200A according to the second embodiment of the present invention using the TCX decoding unit 450, if the LPC synthesis unit 470 uses the linear prediction coding coefficient of 0 degree, i.e., if none of the linear prediction coding coefficients is decoded [case of (c)], the right path in the signal decoding apparatus 200A according to the second embodiment of the present invention shown in FIG. 4 can perform the same function of the first decoding unit 220-1 of the first embodiment.

Therefore, the signal decoding apparatus 200A according to the second embodiment of the present invention uses two modules in a manner of using linear prediction coding coefficients of variable degree in the LPC coding, thereby performing the same function for the decoder 200 according to the first embodiment of the present invention to code a signal generated from mixing audio and speech signals together using three modules.

Figure 7:
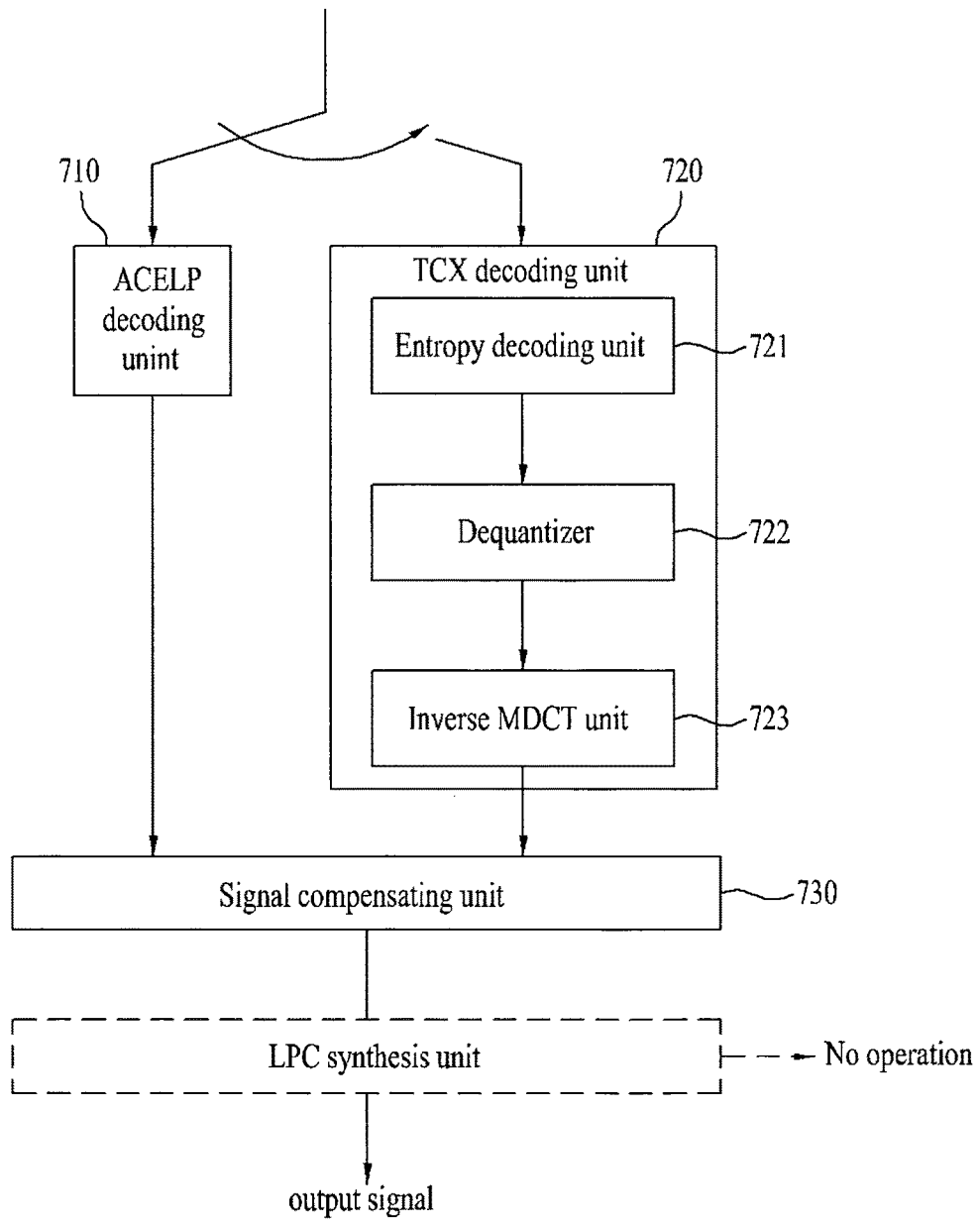
FIG. 7 is a schematic block diagram of a signal decoding apparatus if linear prediction degree information of the present invention indicates 0.

FIG. 7 is a schematic block diagram of a path of a signal generated through the signal decoding apparatus 200A if linear prediction degree information of the present invention indicates 0 [case of (c)]. As configurations and functions of an ACELP decoding unit 710, a TCX decoding unit 720, a signal compensating unit 730 and an LPC synthesis unit 740 shown in FIG. 7 are equal to those of the former units having the same names in FIG. 4, their details are omitted from the following description.

Referring to FIG. 7, if the linear prediction coding degree information of the present invention indicates 0, as mentioned in the foregoing description with reference to FIG. 6, the linear prediction coding coefficients are not decoded but the decoded signal (X) outputted from the signal compensating unit 730 becomes an output signal as it is. Hence, the LPC synthesis is not performed (i.e., the LPC synthesis unit is non-activated). In this case, as mentioned in the foregoing description, the right path in the signal decoding apparatus 200A according to the second embodiment of the present invention shown in FIG. 7 can perform the same function of the first decoding unit 220-1 of the first embodiment.

Meanwhile, as the second decoding unit 220-2 according to the first embodiment of the present invention uses the linear prediction coding coefficients of fixed degree, LPC modeling is essentially performed on a signal not suitable for the LPC modeling. Therefore, it is highly probable that signal distortion may occur. Yet, the signal decoding apparatus 200A according to the second embodiment of the present invention transmits linear prediction coding degree information of low degree for a signal not suitable for the LPC modeling. In particular, the signal decoding apparatus 200A according to the second embodiment of the present invention extremely transmits the linear prediction coding degree information set to 0. Therefore, the signal decoding apparatus 200A according to the second embodiment of the present invention is able to considerably reduce the signal distortion because the speech or audio signal is decoded using the ACELP decoding unit 440 or the TCX decoding unit 450 only.

In order to prevent the signal distortion generated from a contiguous part of signals respectively decoded by different schemes, the signal compensating unit 730 of the signal decoding apparatus 200A according to the second embodiment of the present invention performs time domain aliasing cancellation (TDAC). This is explained with reference to FIGS. 8 to 10 as follows.

Figure 8:
FIG. 8 is a diagram for various examples of applying a different coding scheme per frame (or subframe) to an input signal configured by a block unit according to the present invention.
Figure 8:
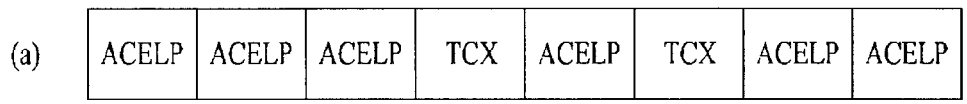
Figure 8:
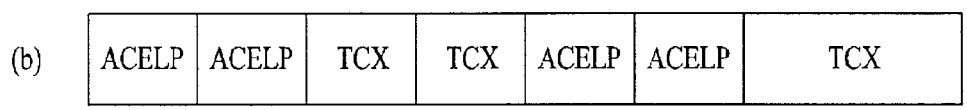
Figure 8:
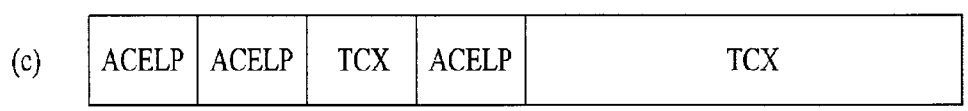

FIG. 8 is a diagram for various examples of applying a different coding scheme per frame (or subframe) to an input signal configured by a block unit according to the present invention.

Referring to FIG. 8, an input signal is configured with a series of frames including an $n^{th}$ frame (Frame n), an $(n+1)^{th}$ frame (Frame n+1) and the like. Moreover, one frame (e.g., $n^{th}$ frame, $(n+1)^{th}$ frame, etc.) is configured with a plurality of subframes (e.g., 4 subframes in FIG. 8). Different coding schemes, as shown in FIG. 8, can be applied to the subframes, respectively. In this case, the coding schemes can include ACELP coding schemes and TCX coding schemes. Referring to FIG. 8(a) to FIG. 8(c), it can be observed that the ACELP coding scheme is applied by one subframe unit. Meanwhile, the TCX coding scheme is applied by one subframe unit [(a)], is applied to two contiguous subframes [(b)], and can be applied to four contiguous subframes [(c)], by which the present invention is non-limited. If the TCX coding scheme is applied to the four contiguous subframes, it means that the TCX coding scheme can be applied to one frame. Thus, it can be observed that a length of a block of an audio signal using the TCX coding scheme of the present invention is preferably set to an integer multiple of a length of a block of a speech signal for applying the ACELP coding scheme, and preferably, to a multiple of (2*integer).

Figure 9:
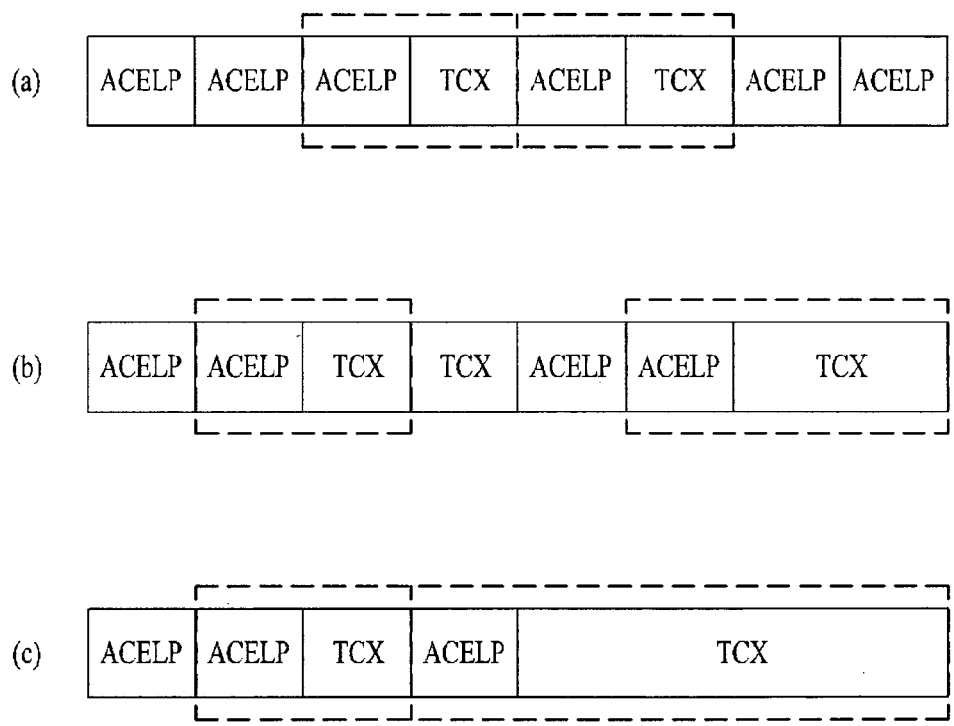
FIG. 9 is a diagram of frames (or subframes), to which different coding schemes are applied, among contiguous frames (or subframes)

FIG. 9 is a diagram of blocks, to which different coding schemes are applied, among the contiguous frames (or subframes) shown in FIG. 8.

Referring to FIG. 9, since each coding scheme uses a different window, the ACELP coding scheme can be classified into a rectangular coding scheme according to a type of window and the like. And, the TCX coding scheme can be classified into a non-rectangular coding scheme. As mentioned in the foregoing description with reference to FIG. 8, the TCX coding scheme is applicable to one subframe, two contiguous subframes or four contiguous subframes (i.e., one frame). In this case, a unit of applying the non-rectangular coding scheme or the rectangular coding scheme shall be named a block. In other words, the block can correspond to the one frame, the one subframe or the two contiguous subframes.

The blocks, to which the different coding schemes are applied, respectively, can be mainly categorized into two kinds of cases. First of all, the ACELP coding scheme (i.e., the rectangular coding scheme) is switched to the TCX coding scheme (i.e., the non-rectangular coding scheme). Secondly, the TCX coding scheme (i.e., the non-rectangular coding scheme) is switched to the ACELP coding scheme (i.e., the rectangular coding scheme). Referring to FIG. 9, in the first case of switching the ACELP coding scheme to the TCX coding scheme, the corresponding contiguous blocks are indicated by dotted lines. For instance, referring to FIG. 9(a), the corresponding contiguous blocks include a third block and a fourth block.

On the contrary, in the case of switching the TCX coding scheme to the ACELP coding scheme, the indication is omitted from FIG. 9. Yet, the corresponding contiguous blocks such as $4^{th}$ and $5^{th}$ blocks exist everywhere.

Thus, since the different coding schemes are used, such defect as aliasing can be generated from the part, at which the rectangular window and the non-rectangular window are overlapped with each other, due to asymmetry. And, the defect generating process and a defect compensating method are explained with reference to FIG. 10 as follows.

Figure 10:
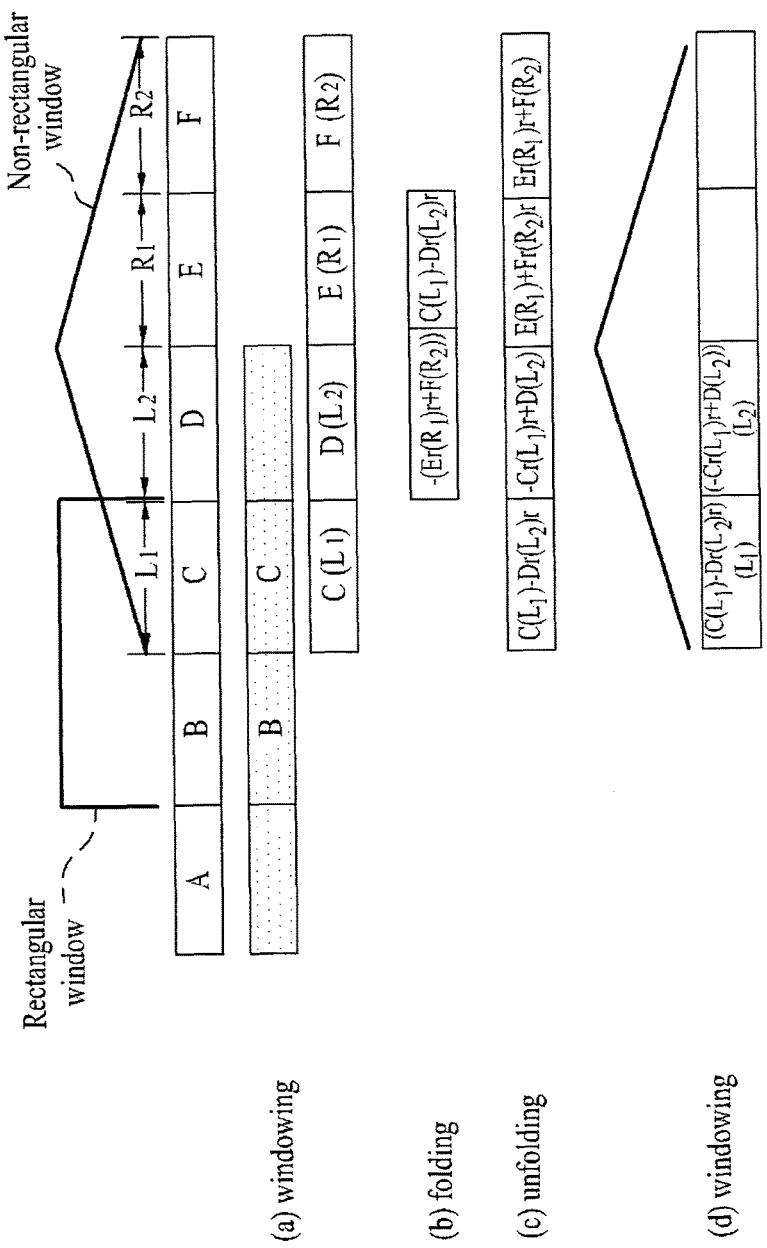
FIG. 10 is a diagram for a processing method in case that windows of different types are overlapped in the frames, to which the different coding schemes are applied, respectively.

FIG. 10 is a diagram for a processing method when different type windows are overlapped with each other in the frames, to which the different coding schemes are applied, respectively.

Referring to FIG. 10, it can be observed that a rectangular window and a non-rectangular window are overlapped with each other in a block C. Regarding a signal configured with bocks A to F, the rectangular window is applied to the block B and the block C. And, the non-rectangular window is applied to the blocks C to F. FIG. 10(a) to FIG. 10(d) show the results from sequentially applying windowing, folding, unfolding and windowing to the blocks A to F, respectively. The windowing, folding, unfolding and windowing indicate the processes sequentially applied to the blocks, respectively, in order to apply the time domain aliasing cancellation (TDAC) in association with the non-rectangular window.

Referring to FIG. 10(a), the results (i.e., dotted blocks) from applying the rectangular window to the block B and the block C are represented on the top. And, the results from applying the non-rectangular window are represented on the bottom. In this case, $C(L_1)$ indicates a result from applying a part $L_1$ of the non-rectangular window to the block C. And, $D(L_2)$ indicates a result from applying a part $L_2$ of the non-rectangular window to the block D. Subsequently, if the folding is performed on the results of the non-rectangular window applied blocks C to F, it is able to obtain the results shown in FIG. 10(b). In this case, Er or Dr indicates 'reverse' as the folding is performed with reference to a block boundary. Afterwards, a result from performing the unfolding is shown in FIG. 10(c). Finally, if the non-rectangular window is applied to the unfolded block, it is able to obtain the result shown in FIG. 10(d).

An uncompensated signal corresponding to an original signal of the block D, i.e., a signal obtained from a transmitted data only can be represented by Formula 4, as shown in FIG. 10(d).

$$\text{uncompensated\_signal}=(-Cr(L_1)r+D(L_2))(L_2) \quad \text{[Formula 4]}$$

In Formula 4, 'C' indicates a data corresponding to the block C, 'D' indicates a data corresponding to the block D, 'r' indicates a reversion, '$L_1$' indicates a result from applying a part $L_1$ of the non-rectangular window, and '$L_2$' indicates a result from applying a part $L_2$ of the non-rectangular window.

As mentioned in the foregoing description, in order to prevent signal distortion, the obtained uncompensated signal requires compensation. Therefore, a compensating signal for compensating the uncompensated signal to become identical or similar to an original signal is calculated and transmitted. And, the compensating signal will be used by the signal compensating unit 460 of the signal decoding apparatus 200A. In doing so, a method of calculating the compensating signal generally follows a method of processing a wide-sense audio signal having speech and audio signal mixed therein and its details shall be omitted from the following description.

In the following description, applications including the signal encoding apparatus 100A or the signal decoding apparatus 200A according to the second embodiment of the present invention are described with reference to FIGS. 11 to 14.

Figure 11:
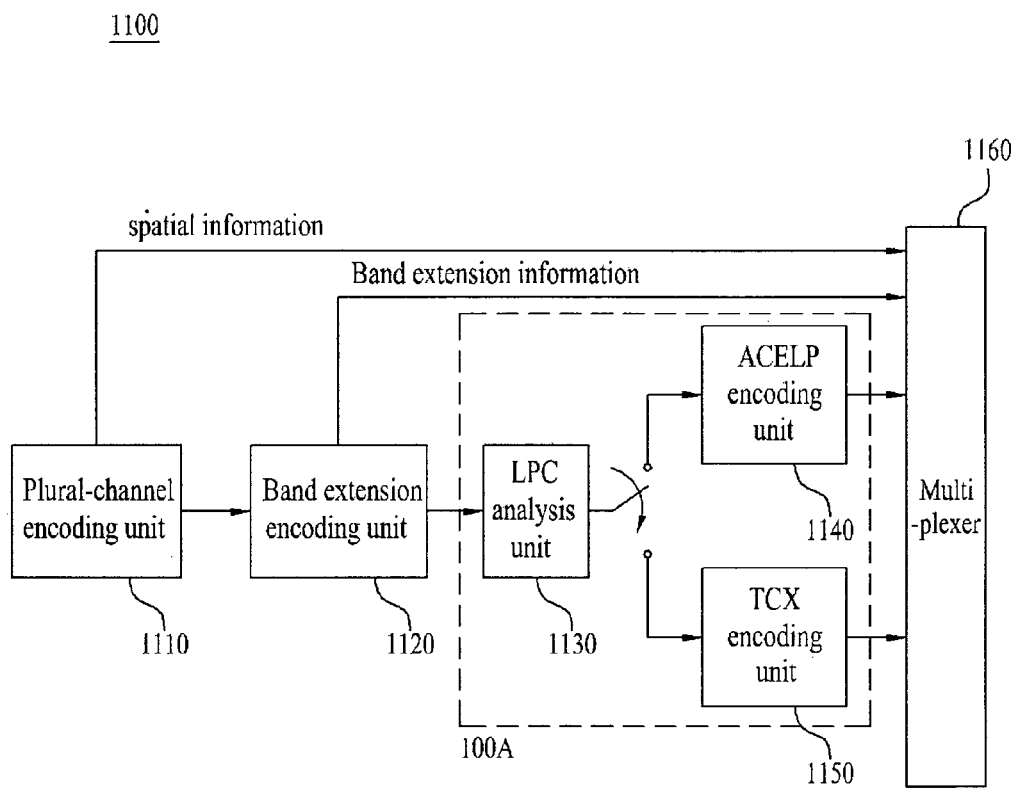
FIG. 11 is a schematic block diagram of a signal encoding apparatus according to another embodiment of the present invention.
Figure 12:
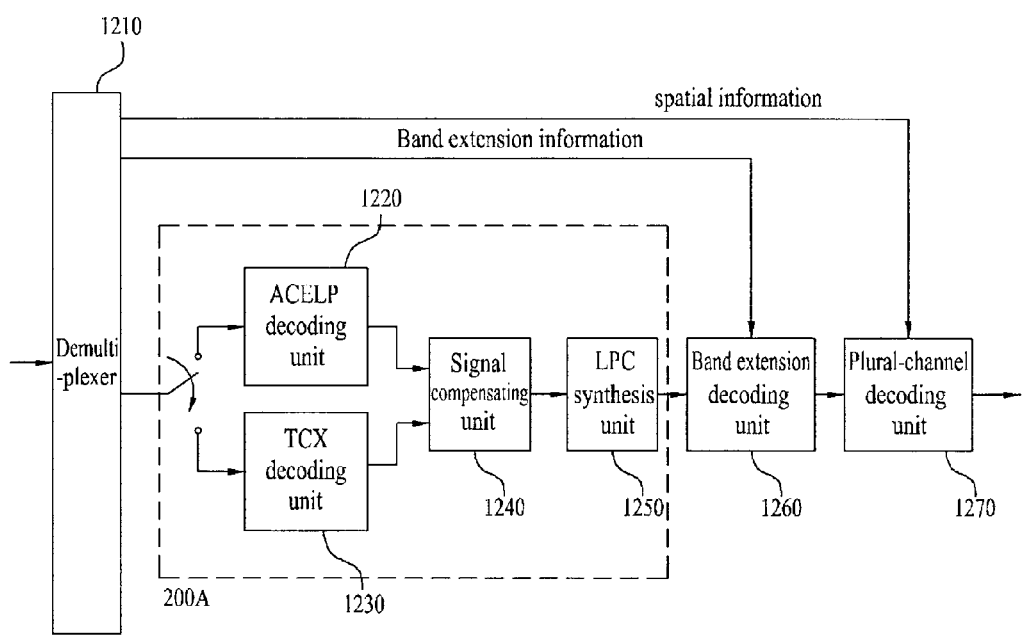
FIG. 12 is a schematic block diagram of a signal decoding apparatus according to another embodiment of the present invention.

FIG. 11 is a block diagram of an encoder 1100 including the signal encoding apparatus 100A according to the second embodiment of the present invention. And, FIG. 12 is a block diagram of a decoder 1200 including the signal decoding apparatus 200A according to the second embodiment of the present invention.

Referring to FIG. 11, an encoder 1100 includes a plural channel encoding unit 1110, a band extension encoding unit 1120, a signal encoding apparatus 100A according to a second embodiment of the present invention, and a multiplexer 1160.

First of all, a downmix signal generated from downmixing an inputted plural channel signal by the plural channel encoding unit 110 is named a full-range downmix signal. And, after a high frequency band signal is removed from the full-range down mix signal, a downmix signal, in which a low frequency band exists, is named a low frequency band downmix signal.

The plural channel encoding unit 110 receives an input of a plural channel signal. In this case, the plural channel signal means a signal having at least three channels in general and is able to include a mono signal or a stereo signal. The plural channel encoding unit 1110 generates a full-range downmix signal by downmixing the inputted plural channel signal and also generates spatial information necessary to upmix the full-range downmix signal into a plural channel signal. In this case, the spatial information can include at least one of channel level difference information, channel prediction coefficients, inter-channel correlation information, downmix gain information and the like. If the plural channel encoding unit 1110 receives an input of a mono signal, downmixing is not performed and the mono signal can bypass the plural channel encoding unit 110.

The band extension encoding unit 1120 receives the full-range downmix signal and is then able to generate spectral data corresponding to a low frequency band in the full-range downmix signal and extension information corresponding to a signal of a frequency band. The extension information is the information for the decoder stage to reconstruct the low frequency band downmix signal, from which the frequency band is removed, into the full-range downmix signal. And, the extension information can be transmitted together with the spatial information.

The input signal is determined to be coded by a specific scheme based on signal property. And, coding mode information indicating the coding scheme is generated [not shown in the drawing]. In this case, as mentioned in the foregoing descriptions with reference to FIG. 2 and FIG. 3, the coding scheme can include the ACELP coding scheme or the TCX coding scheme. As mentioned in the foregoing descriptions with reference to FIG. 2 and FIG. 3, before the low frequency band downmix signal is coded by the coding scheme, the linear prediction coding (LPC) is performed using the variable degree.

First of all, the linear prediction coding degree is determined according to property of the low frequency band downmix signal inputted to the LPC analysis unit 1130. Based on the determined linear prediction coding degree, linear prediction coding coefficients and an LPC residual are then generated by performing the linear prediction coding.

Subsequently, the LPC residual is encoded by the coding scheme determined according to the coding mode information.

If a specific frame or segment of the low frequency band downmix signal has a dominant speech property, the ACELP encoding unit 1140 performs encoding by the ACELP scheme. In this case, the ACELP scheme may follow the AMR-WB (adaptive multi-rate wide-band) standard, by which the present invention is non-limited. Since the signal inputted to the ACELP encoding unit 1140 can have high redundancy on a time axis, modeling is possible by the linear prediction that predicts a current signal from a past signal. Therefore, if the linear prediction coding scheme is adopted, coding efficiency can be raised. Moreover, the ACELP encoding unit 1140 can correspond to a time domain encoder.

In case of attempting to code a signal, in which a specific frame or segment of a low frequency band downmix signal has an audio-dominant property, or in case of attempting to code an audio signal in the signal having audio and speech properties are mixed, the TCX encoding unit 1150 is selected to encode the corresponding signal. In doing so, the TCX coding scheme can include the scheme of performing frequency transform on the LPC residual obtained from performing the linear prediction coding. In this case, the frequency transform can be performed by MDCT (modified discrete cosine transform), AAC (advanced audio coding) standard or HE-AAC (high efficiency advanced audio coding) standard, by which the present invention is non-limited. In particular, as mentioned in the foregoing descriptions with reference to FIG. 2 and FIG. 3, since the LPC analysis unit 1130 performs the linear prediction coding of the variable degree, the TCX encoding unit 1150 of the present invention is able to play a role as a signal coding unit according to the AAC standard or the HE-AAC standard. For instance, if a specific frame or segment of a low frequency band downmix signal has a dominant audio property, the LPC analysis unit 1130 performs the linear prediction coding of low degree, or may not perform the linear prediction coding extremely. Instead, the corresponding encoding is performed by the TCX encoding unit 1150. Hence, the same function of the signal coding unit according to the AAC standard or the HE-AAC standard can be performed.

The multiplexer 1160 generates at least one or more bitstreams by multiplexing the spatial information, the band extension information, the data encoded by the ACELP encoding unit 1140, the data encoded by the TCX encoding unit 1150 and the like together and then transmits the generated at least one or more bitstreams.

Referring to FIG. 12, the decoder 1200 includes a demultiplexer 1210, a signal decoding apparatus 220A, a band extension decoding unit 1260 and a plural channel decoding unit 1270.

The demultiplexer 1210 extracts the encoded signal data, band extension information, spatial information and the like encoded from the bitstream transmitted by the encoder.

The signal decoding apparatus 200A including an ACELP decoding unit 1220, a TCX decoding unit 1230, a signal compensating unit 1240 and an LPC synthesis unit 1250 has the same configurations and functions described with reference to FIGS. 4 to 10 and its details are omitted from the following description.

By performing a band extension decoding scheme on an output signal from the signal decoding apparatus 200A using the band extension information, the band extension decoding unit 1260 reconstructs a downmix signal of a high frequency band and is able to output a full-range downmix signal.

In doing so, it is able to generate the full-range downmix signal using the whole low frequency band downmix signal and the band extension information or using the low frequency band downmix signal in part.

The plural channel decoding unit 1270 is able to generate a plural-channel output signal (e.g., stereo signal included) by applying the spatial information to the full-range downmix signal.

The signal processing apparatus according to the second embodiment of the present invention is available for various products to use. Theses products can be mainly grouped into a stand alone group and a portable group. A TV, a monitor, a settop box and the like can be included in the stand alone group. And, a PMP, a mobile phone, a navigation system and the like can be included in the portable group.

Figure 13:
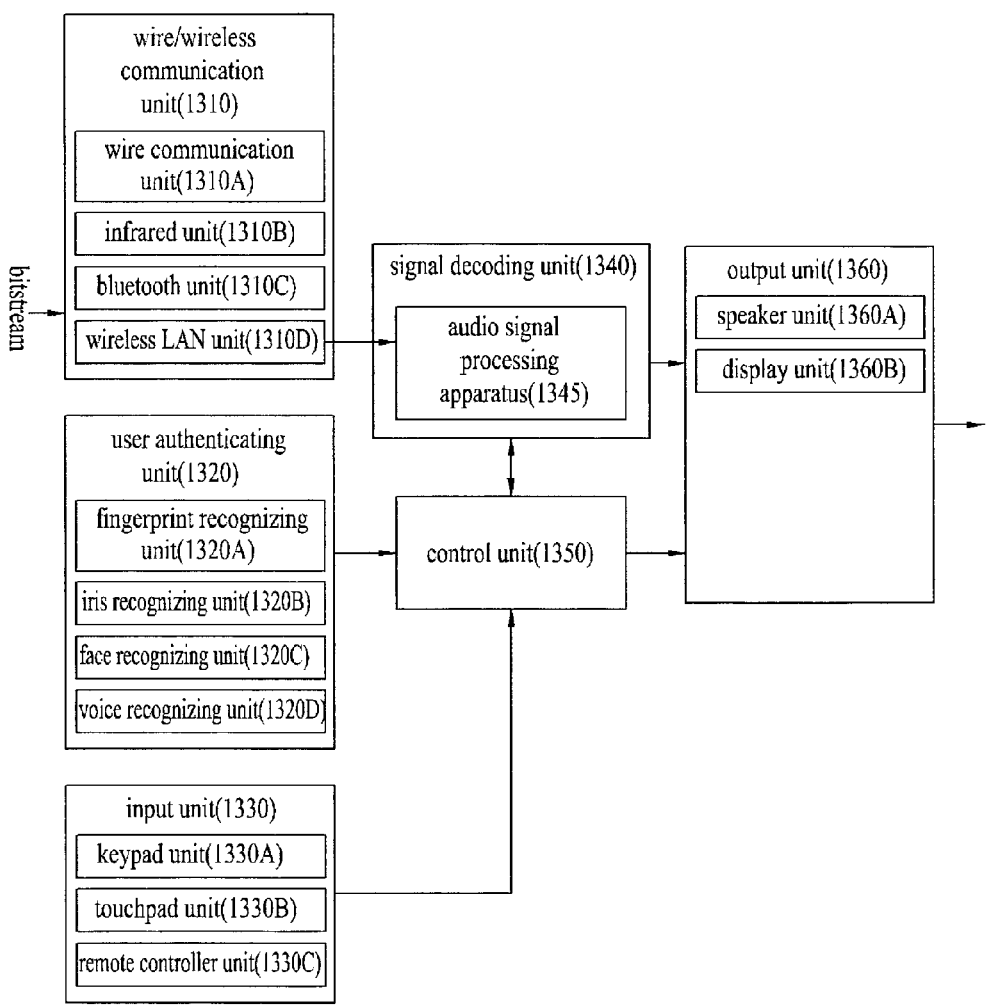
FIG. 13 is a schematic block diagram of a product in which a signal decoding apparatus according to the present invention is implemented.

FIG. 13 shows relations between products, in which a signal processing apparatus 200A according to a second embodiment of the present invention is implemented.

Referring to FIG. 13, a wire/wireless communication unit 1310 receives a bitstream via wire/wireless communication system. In particular, the wire/wireless communication unit 1310 can include at least one of a wire communication unit 1310A, an infrared unit 1310B, a Bluetooth unit 1310C and a wireless LAN unit 1310D.

A user authenticating unit 1320 receives an input of user information and then performs user authentication. The user authenticating unit 1320 can include at least one of a fingerprint recognizing unit 1320A, an iris recognizing unit 1320B, a face recognizing unit 1320C and a voice recognizing unit 1320D. The fingerprint recognizing unit 1320A, the iris recognizing unit 1320B, the face recognizing unit 1320C and the speech recognizing unit 1320D receive fingerprint information, iris information, face contour information and voice information and then convert them into user informations, respectively. Whether each of the user informations matches pre-registered user data is determined to perform the user authentication.

An input unit 1330 is an input device enabling a user to input various kinds of commands and can include at least one of a keypad unit 1330A, a touchpad unit 1330B and a remote controller unit 1330C, by which the present invention is non-limited.

A signal coding unit 1340 performs encoding or decoding on an audio signal and/or a video signal, which is received via the wire/wireless communication unit 1310, and then outputs an audio signal in time domain. The signal coding unit 1340 includes an audio signal processing apparatus 1345. As mentioned in the foregoing description, the audio signal processing apparatus 1345 corresponds to the signal encoding apparatus 100A or the signal decoding apparatus 200A according to the second embodiment of the present invention. Thus, they can be implemented by at least one or more processors.

A control unit 1350 receives input signals from the input unit 1330 and controls all processes of the signal decoding unit 1340 and an output unit 1360. In particular, the output unit 1360 is a component configured to output an output signal generated by the signal decoding unit 1340 and the like and can include a signal output unit 1360A and a display unit 1360B. If the output signal is an audio signal, it is outputted via the signal output unit 1360A. If the output signal is a video signal, it is outputted via the display unit 1360B.

Figure 14:
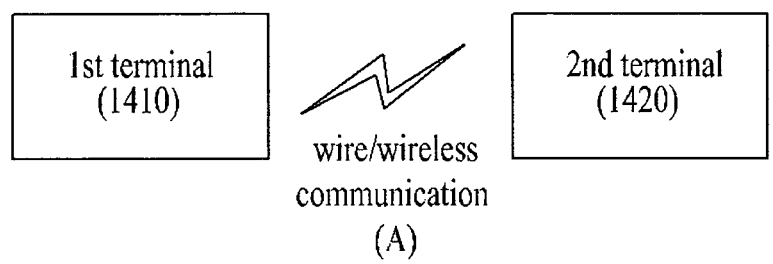
FIG. 14 is a diagram for explaining relations between products in which a signal processing apparatus according to the present invention is implemented.
Figure 14:
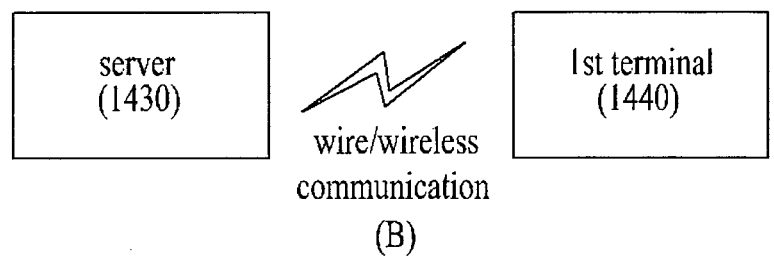

FIG. 14 is a diagram for explaining relations between products in which a signal processing apparatus according to the present invention is implemented, in which the relation between a terminal and server for the products shown in FIG. 13 is shown.

Referring to FIG. 14(A), it can be observed that a first terminal 1410 and a second terminal 1420 can exchange data or bitstreams bi-directionally with each other via the wire/wireless communication units. Referring to FIG. 14(b), it can be observed that a server 1430 and a first terminal 1440 can perform wire/wireless communications with each other.

Thus, as the signal processing apparatus is included in a real product, linear prediction coding degree information indicating a variable degree is used according to property of a signal. Therefore, using modules less than those of a general signal processor, it is able to efficiently code a signal having speech and audio signals mixed therein.

A decoding/encoding method according to the present invention can be implemented into a computer-executable program and can be stored in a computer-readable recording medium. And, multimedia data having a data structure of the present invention can be stored in the computer-readable recording medium. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, a bitstream generated by the above mentioned encoding method can be stored in the computer-readable recording medium or can be transmitted via wire/wireless communication network.

INDUSTRIAL APPLICABILITY

Accordingly, the present invention is applicable to encoding and decoding an audio signal.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of processing a signal, comprising:
receiving coding mode information indicating a speech coding scheme or an audio coding scheme, linear prediction coding degree information indicating a linear prediction coding degree, and the signal including at least one of a speech signal or an audio signal;
decoding the signal according to the speech coding scheme or the audio coding scheme based on the coding mode information;
decoding linear prediction coding coefficients of the signal based on the linear prediction coding degree information; and
generating an output signal by applying the decoded linear prediction coding coefficients to the decoded signal,
wherein the linear prediction coding degree is determined based on a variation of a value of an LPC residual generated from performing the linear prediction coding on the signal by:
determining whether the value of the LPC residual generated from performing the linear prediction coding is reduced by increasing the linear prediction coding degree:
based on a determination that the value of the LPC residual is reduced by increasing the linear prediction coding degree, determining the linear prediction coding degree to be a first degree: and
based on a determination that the value of the LPC residual is not reduced by increasing the linear prediction coding degree, determining the linear prediction coding degree to be a second degree lower than the first degree,
wherein the first degree is greater than zero degree.

2. The method of claim 1, wherein if the signal is the speech signal having a lot of voiced sound, the linear prediction coding degree information indicates a degree higher than that of the speech signal having a lot of unvoiced sound.

3. The method of claim 1, wherein if the signal is the audio signal having a strong tonal component, the linear prediction coding degree information indicates a degree higher than that of the audio signal having a weak tonal component.

4. The method of claim 1, wherein if the signal is an audio-like signal, the linear prediction coding degree information indicates a degree lower than that of a speech-like signal.

5. The method of claim 1, wherein a frame length of the audio signal is an integer multiple of a frame length of the speech signal.

6. The method of claim 1, further comprising:
if the decoded signal is the speech or audio signal and a signal of a previous frame is different from the decoded signal, preventing aliasing by compensating the decoded signal using the signal of the previous frame.

7. An apparatus for processing a signal, comprising:
a multiplexer receiving an LPC bitstream including linear prediction coding degree information indicating a linear prediction coding degree and linear prediction coding coefficients, the signal including at least one of a speech signal or an audio signal, and coding mode information indicating a speech coding scheme or an audio coding scheme;
an ACELP decoding unit decoding the signal according to the speech coding scheme if the coding mode information indicates the speech coding scheme;
a TCX decoding unit decoding the signal according to the audio coding scheme if the coding mode information indicates the audio coding scheme; and
an LPC synthesis unit decoding the linear prediction coding coefficients of the signal based on the linear prediction coding degree information, and generating an output signal by applying the decoded linear prediction coding coefficients to the decoded signal,
wherein the linear prediction coding degree information is determined based on a variation of a value of an LPC residual generated from performing the linear prediction coding on the signal by:
determining whether the value of the LPC residual generated from performing the linear prediction coding is reduced by increasing the linear prediction coding degree;
based on a determination that the value of LPC residual is reduced by increasing the linear prediction coding degree, determining the linear prediction coding degree to be a first degree; and
based on a determination that the value of LPC residual is not reduced by increasing the linear prediction coding degree, determining the linear prediction coding degree to be a second degree lower than the first degree,
wherein the first degree is greater than zero degree.

8. The apparatus of claim 7, wherein the LPC synthesis unit comprises:
an LPC degree information decoding unit decoding the linear prediction coding degree information from the LPC bitstream;
an LPC coefficients extracting unit extracting the linear prediction coding coefficients from the LPC bitstream based on the linear prediction coding degree information; and
a signal synthesis unit generating the output signal by applying the linear prediction coding coefficients to the decoded signal.

9. The apparatus of claim 8, if the linear prediction coding degree information indicates that the linear prediction coding coefficients are not decoded, wherein the decoded signal bypasses the signal synthesis unit and is then outputted.

10. The apparatus of claim 7, wherein if the signal is the speech signal having a lot of voiced sound, the linear prediction coding degree information indicates a degree higher than that of the speech signal having a lot of unvoiced sound.

11. The apparatus of claim 7, wherein if the signal is the audio signal having a strong tonal component, the linear prediction coding degree information indicates a degree higher than that of the audio signal having a week tonal component.

12. The apparatus of claim 7, further comprising:
if a coding scheme of the decoded signal adopts the coding scheme different from that of the decoded signal of a previous frame, a signal compensating unit preventing aliasing by compensating the decoded signal using the decoded signal of the previous frame.

13. The apparatus of claim 7, wherein a frame length of the audio signal is an integer multiple of a frame length of the speech signal.

14. A method of processing a signal comprising:
determining linear prediction coding degree information indicating a degree of linear prediction coding coefficients according to property of an input signal;
determining the linear prediction coding coefficients based on the linear prediction coding degree information;

generating an LPC residual using the linear prediction coding coefficients and the input signal; and
encoding the LPC residual using either an audio coding scheme or a speech coding scheme,
wherein the linear prediction coding degree information is determined based on a variation of a value of an LPC residual generated from performing the linear prediction coding on the input signal by:
determining whether the value of the LPC residual generated from performing the linear prediction coding is reduced by increasing the linear prediction coding degree:
based on a determination that the value of LPC residual is reduced by increasing the linear prediction coding degree, determining the linear prediction coding degree to be a first degree: and
based on a determination that the value of LPC residual is not reduced by increasing the linear prediction coding degree, determining the linear prediction coding degree to be a second degree lower than the first degree,
wherein the first degree is greater than zero degree.

15. An apparatus for processing a signal, comprising:
an LPC analysis unit determining linear prediction coding degree information indicating a variable degree of linear prediction coding coefficients according to property of an input signal, the LPC analysis unit determining the linear prediction coding coefficients based on the linear prediction coding degree information, the LPC analysis unit generating an LPC residual using the linear prediction coding coefficients and the input signal;
an ACELP encoding unit encoding the LPC residual using an audio coding scheme;
a TCX encoding unit encoding the LPC residual using a speech coding scheme;
and a multiplexer generating a bitstream including the linear prediction coding degree information, the linear prediction coding coefficients and the encoded LPC residual encoded by the ACELP encoding unit or the TCX encoding unit,
wherein the linear prediction coding degree information is determined based on a variation of a value of an LPC residual generated from performing the linear prediction coding on the input signal by:
determining whether the value of the LPC residual generated from performing the linear prediction coding is reduced by increasing the linear prediction coding degree:
based on a determination that the value of LPC residual is reduced by increasing the linear prediction coding degree, determining the linear prediction coding degree to be a first degree: and
based on a determination that the value of LPC residual is not reduced by increasing the linear prediction coding degree, determining the linear prediction coding degree to be a second degree lower than the first degree,
wherein the first degree is greater than zero degree.

* * * * *